UNITED STATES PATENT OFFICE.

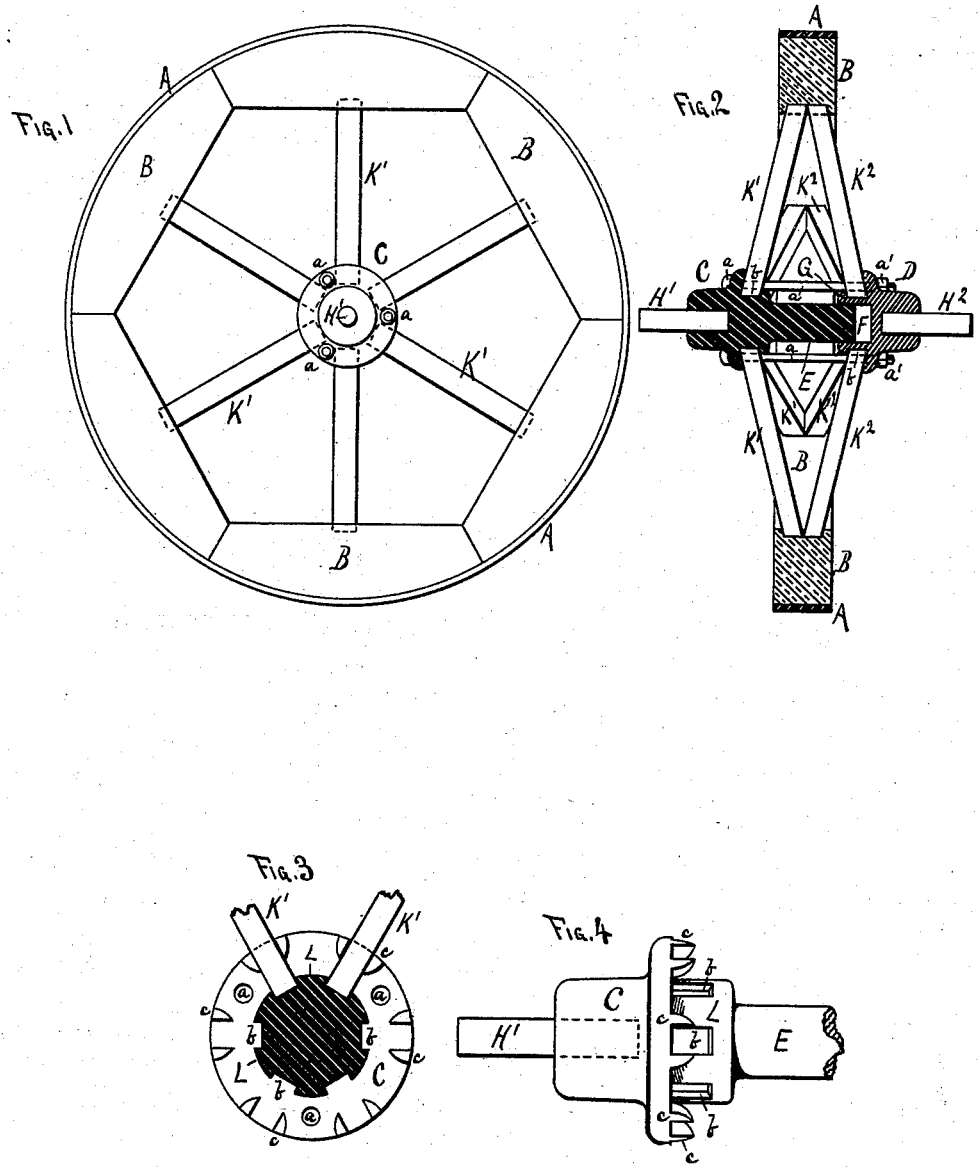

CHARLES HAZOR SMITH, OF KNAPP, WISCONSIN.

VEHICLE-WHEEL.

SPECIFICATION forming part of Letters Patent No. 262,990, dated August 22, 1882.

Application filed March 1, 1882. (No model.)

*To all whom it may concern:*

Be it known that I, CHARLES HAZOR SMITH, a citizen of the United States, and a resident of Knapp, in the county of Dunn and State of Wisconsin, have made certain new and useful Improvements in Wheels, of which the following is a specification.

This invention relates to the wheels of vehicles, but more particularly to wheelbarrow-wheels; and it consists in the construction and combination of parts hereinafter described and claimed. I attain these objects by the use of the mechanism illustrated by the accompanying drawings, in which—

Figure 1 is a side view, and Fig. 2 is a sectional front elevation, of a wheelbarrow-wheel constructed according to my invention. Fig. 3 is a cross-sectional view, and Fig. 4 is a side view, of a portion of the hub detached and enlarged.

A is the tire, and B the felly, the latter formed in several parts, with their ends fitting squarely against each other, and with either straight or concave inner surfaces.

The hub consists of two parts, C D, the part C provided with a stud, E, adapted to fit into a corresponding cavity, F, in a larger stud, G, on the part D, each of the parts having a steel stud or gudgeon, $H'$ $H^2$, cast therein, as shown. The two parts C D are connected to each other by bolts $a$, and by screwing up or loosening the nuts $a'$ the parts may be drawn toward or permitted to be moved away from each other.

$K'$ $K^2$ are the spokes, arranged in pairs, as shown, each pair facing each other, and with the upper ends of each pair meeting in a common mortise in the center of each of the fellies B, while their lower ends branch outward at an angle and are stepped into sockets $b$ in the stud G of the part D and an enlargement, L, on the stud E of the part C. Small lugs or pins $c$, projecting from the inside of the flanges of the parts C and D (see Figs. 3 and 4) pass between the spokes and aid in supporting them. By this arrangement it will be very readily seen that by tightening up on the nuts $a'$ of the bolts $a$ the parts C and D may be drawn toward each other, and, carrying the spokes $K'$ $K^2$ with them, will force the fellies B outward against the tire A, and so firmly and solidly hold the whole wheel together and secure the proper tension on the tire, and by means of the stud E, running in the cavity F, the hub is kept in line. The cavity F will be deep enough, so that no danger will exist of the end of the stud E ever striking the bottom of the cavity. Hence room is always left for tightening the tire when the wheel becomes loose by simply turning the nuts $a'$ up a turn or two, thus producing a wheel upon which any person may quickly and easily tighten the tire without removing it from the wheel, removing the wheel from its frame, or the application of heat.

This form of wheel is intended more particularly for wheelbarrows, but may be used for many other purposes. The spokes are simply straight pieces of wood without tenons or shoulders, and by this arrangement the full strength of the wood is retained and not weakened by cutting any part away. The pressure and strain upon the spokes are entirely endwise. The wheel is put together without heating the tire, and may be taken apart and put together again without skilled labor.

The parts may be packed separately for shipment and put together again where the vehicle is to be used, thus saving a large expense for freight, as the "knocked-down" wheels will occupy much less space than the same when ".set up."

By arranging the spokes in pairs, as shown, a much lighter spoke may be used than if they were arranged alternately, as the spokes thus support each other.

What I claim as new is—

1. The within-described hub, consisting of the part C, formed with stud E, sockets $b$, and dividing-spurs $c$, and provided with steel gudgeon $H'$, in combination with the part D, formed with hollow stud G and provided with steel gudgeon $H^2$, substantially as and for the purpose specified.

2. The hub consisting of the parts C and D, constructed substantially as described, and with means for drawing them toward each other, in combination with pairs of spokes $K'$ $K^2$, stepped by their lower ends in opposite positions in said parts C and D and radiating outward from the hub and inclining inward as they approach the fellies, and each pair ending in a common mortise in each felly.

3. The combination of the hub, consisting of the parts C D, having the gudgeons H' H², studs E G, sockets $b$, and dividing-spurs $c$, and bolts $a\ a'$, with the spokes K' K², fellies B, and tire A, substantially as set forth.

4. In a wheel, the spokes arranged in opposite pairs, and with the outer ends of each pair in contact with each other and adapted to fit into one common mortise in the felly or fellies, and with means for drawing their inner ends toward each other on a line parallel with the axle of the wheel, substantially as and for the purpose set forth.

In testimony whereof I have hereunto set my hand in the presence of two subscribing witnesses.

CHARLES HAZOR SMITH.

Witnesses:
ED. C. COLEMAN,
OWEN GARDANIER.